C. O. GUSTAVSEN.
PROCESS FOR MAKING HELICOID OR SPIRAL CONVEYERS.
APPLICATION FILED APR. 23, 1906.
908,859. Patented Jan. 5, 1909.
  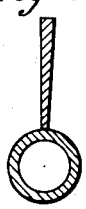 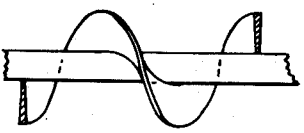
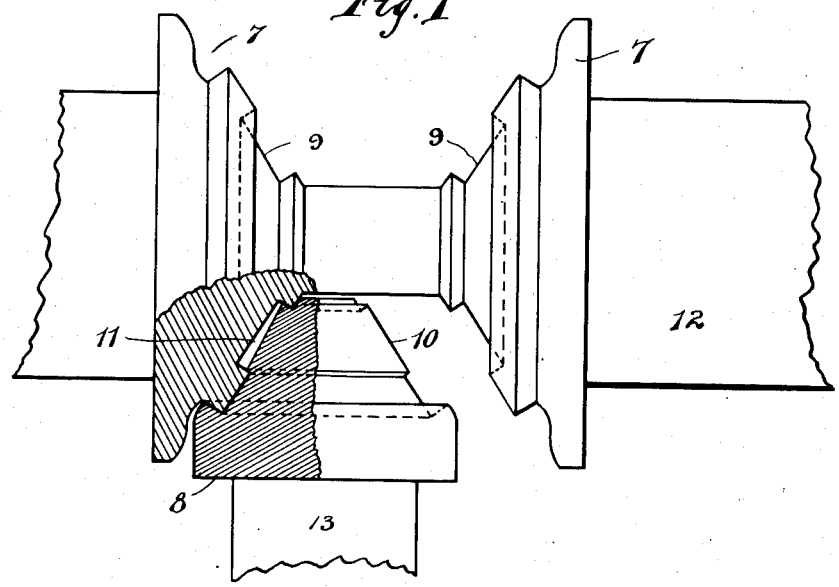
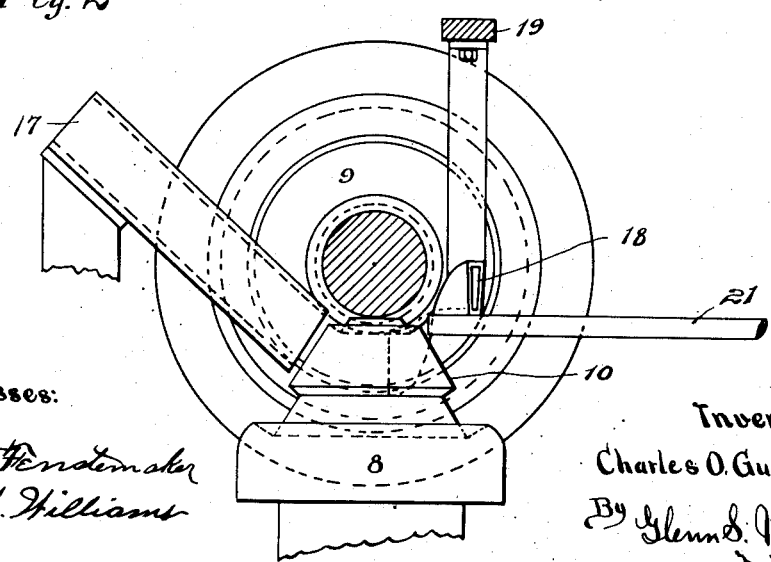
Inventor,
Charles O. Gustavsen

UNITED STATES PATENT OFFICE.

CHARLES O. GUSTAVSEN, OF COLUMBUS, OHIO, ASSIGNOR, BY MESNE ASSIGNMENTS, TO THE JEFFREY MANUFACTURING COMPANY, A CORPORATION OF OHIO.

PROCESS FOR MAKING HELICOID OR SPIRAL CONVEYERS.

No. 908,859.        Specification of Letters Patent.        Patented Jan. 5, 1909.

Original application filed March 13, 1905, Serial No. 249,868. Divided and this application filed April 23, 1906. Serial No. 313,343.

*To all whom it may concern:*

Be it known that I, CHARLES O. GUSTAVSEN, a citizen of the United States, residing at Columbus, in the county of Franklin and State of Ohio, have invented certain new and useful Improvements in Processes for Making Helicoid or Spiral Conveyers, of which the following is a specification.

This invention relates more particularly to making helicoids or spirals from strips of steel or other suitable metal, such devices being used for conveyers or like purposes. Its objects are to form a spiral or helicoid from a strip or bar of suitable material of uniform thickness so that the resulting spiral or helicoid will be of uniform thickness, or so that it will be thicker at the outer edge than at the inner edge; or to form a spiral or helicoid from a strip which is thicker at one edge than at the other edge, the resulting spiral maintaining the same relative form of cross-section.

Further objects will be pointed out hereafter in the following description.

In the accompanying drawings illustrating this invention, Figure 1 represents a side view partly broken away, of conical rolls used in rolling helicoids according to this invention; Fig. 2 is an end view showing an arrangement of the guides for feeding the material to the rolls and taking it away therefrom; Fig. 3 is a view showing a section of the strip from which a helicoid is to be rolled, the dotted lines representing the cross-section of the metal after it has been formed into a spiral of uniform thickness; Fig. 4 represents a cross-section of material of another form, the dotted lines showing the shape of the cross-section of the resulting spiral; Fig. 5 shows a cross-section of a spiral or helicoid with its outer edge of greater thickness than its inner edge, the latter being the edge nearest to the pipe or shaft upon which the spiral is usually secured, this form being made according to the present invention from a strip of uniform thickness; and Fig. 6 represents a portion of completed spiral having its cross-section increasing gradually toward its outer edge.

Heretofore, the usual method of rolling spirals from continuous strips has been to form the spiral by elongating and thinning the outer edge of the strips as the spiral was being formed. For instance, if the strip from which the spiral was made was of uniform thickness, then the resulting spiral would have its outer edge considerably thinner than its inner edge; or if the strip were thicker at one edge than the other, then the resulting spiral would be of uniform thickness. According to this improved process, spirals or helicoids are rolled from a continuous strip of suitable metal in such a way that the resulting spiral formed from a strip of uniform thickness may itself be of uniform thickness, or may be thicker at its outer edge than at its inner edge; and in a similar way, using a strip of stock having one edge thicker than the other, a spiral may be formed having its outer edge thicker than its inner edge in a manner corresponding to the stock from which it is rolled.

As shown in the drawings, Fig. 1 shows a pair of rolls of the form which I prefer to use in carrying out this process. 7 represents a large roll; and 8, a smaller roll which coacts with the large roll. These rolls may be arranged and driven in any desired manner, for instance, as shown and described in my previous patent No. 760,448 of May 24, 1904. The roll 7 is provided with a peripheral groove 9 into which extends a peripheral or annular ring or portion 10 on the roll 8. The ring 10 does not extend to the full depth of the groove 9, but leaves a passage or box-pass 11 between its outer surface and the bottom of the groove 9. This pass may be rectangular in outline, as when a helicoid of uniform thickness is to be produced, or may be wider at its outer edge than at its inner edge as shown in the drawing so that the resulting spiral will be thicker at its outer edge than at its inner edge.

The feed guide is set at such an angle to a plane passing through the centers of the rolls and through the box-pass, that the material will be presented to the rolls so that they will crowd or squeeze the material across the width of the stock bar as it is fed to them, so that the helicoid produced may be of uniform thickness or may even be thicker at its outer edge than at its inner edge. In other words, instead of simply making the material thinner at the outer edge in order to allow additional length for the spiral, the material is crowded across the width of the stock to make up for the additional length, the thickness remaining substantially the same, or even greater at the outer edge. As shown in Fig. 2, the feed guide 17 is considerably higher at its outer end than at the inner end which is adjacent to the pass, so that the material or bar fed into the machine will first be engaged at its upper forward corner which is nearest to the center, and thus the material travels, as it were, at an angle through the pass. The guide 17 may be supported in any desired manner from the frame of the machine.

The discharge or forming guide 18 is made in the form of the helicoid to be produced, and strips the material directly from the rolls, thus preventing any tendency of the material to wrap around either of the rolls. This guide also may be supported in any desired manner, as from a cross-bar 19 secured to the frame of the machine.

Having this preferred form of machine for carrying out the principal steps in my improved method, this method consists in forming a helicoid from a strip of suitable material, preferably iron or steel, either hot or cold, by feeding said metal to suitable rolls preferably of conical form having a properly shaped pass, and by feeding it to such rolls in such a manner that the resulting helicoid will be either of uniform thickness or thicker at its outer edge than at its inner edge when formed from stock of uniform thickness. This manner being to present the stock at a suitable angle to the pass. Likewise, if the stock from which the helicoid is to be formed is of tapering cross-section, or thicker at one edge than at the other edge, by my improved method the resulting helicoid may be proportionately thicker at its outer edge than at its inner edge than when formed of stock of uniform thickness. In carrying out this process, the material is preferably heated in a suitable furnace to a proper degree of temperature, and is then fed through the feed guide directly to the rolls which crowd the material from the inner toward the outer edge and simultaneously elongate the outer edge sufficiently to form the desired helicoid or spiral. The spiral or helicoid thus formed is trued up or completed by passing through the forming guide which has the shape of the resulting spiral which is to be formed. As the spiral comes from the machine, it is received on a mandrel or pipe 21 which supports it until it becomes sufficiently cooled to be removed.

This application is a division of my former application for a patent for helicoid or spiral conveyer and machine for making the same, filed March 13, 1905; Serial No. 249,803.

I do not claim herein the article or the machine for making same, but

What I claim and desire to secure by Letters Patent is:

1. A process of forming metallic spirals or helicoids from a continuous strip or bar, which consists in feeding a strip of suitable material to a pair of substantially conical rolls at an angle of less than 90 degrees towards the smaller ends of said rolls to a pitch line or line common to said rolls, and maintaining the strip in such feeding position as it is being passed through said rolls.

2. A process of forming spiral or helicoids which consists in forming a flight from a strip of metal of uniform thickness by presenting and maintaining the strip as it is fed to a pair of conical rolls, at an acute angle to the pitch line or line common to the two rolls, said angle being measured in the direction towards the apices of said rolls whereby the material of the strip is crowded across the width thereof, while the outer edge is simultaneously elongated to form the spirals or helicoids.

3. The process of forming a conveyer flight or the like which consists in heating a strip of suitable metal of uniform thickness and then passing said strip through a pass between two conical rolls, one of said rolls being arranged horizontally and the other vertically and beneath said horizontal roll, said strip being presented and maintained in a feeding position at an angle of less than 90 degrees to a plane at right angles to the common tangent element of the pitch cones of said rolls, whereby the metal will be crowded across the strip while the outer edge is being elongated to form the spiral, the resulting spiral being preferably of the same thickness or thicker at this outer edge than at its inner edge.

CHARLES O. GUSTAVSEN.

Witnesses:
 SADIE CLYMER,
 S. J. WHITE.